(12) United States Patent
Ando et al.

(10) Patent No.: US 8,101,490 B2
(45) Date of Patent: Jan. 24, 2012

(54) METHOD FOR MANUFACTURING SEMICONDUCTOR DEVICE AND APPARATUS FOR MANUFACTURING SAME

(75) Inventors: Masanobu Ando, Kanagawa-ken (JP); Toru Gotoda, Kanagawa-ken (JP); Toru Kita, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/728,841

(22) Filed: Mar. 22, 2010

(65) Prior Publication Data
US 2011/0039356 A1 Feb. 17, 2011

(30) Foreign Application Priority Data
Aug. 11, 2009 (JP) ................................. 2009-186535

(51) Int. Cl.
*H01L 21/331* (2006.01)
*H01L 21/8222* (2006.01)

(52) U.S. Cl. ........ 438/311; 438/459; 438/513; 438/692; 438/776; 257/E21.006; 257/E21.053; 257/E21.126; 257/E21.134; 257/E21.217; 257/E21.218; 257/E21.229; 257/E21.304; 257/E21.32; 257/E21.329; 257/E21.352

(58) Field of Classification Search .................. 438/311, 438/22, 91, 459, 503, 692, 604, 513, 686, 438/776, 791, 795; 257/E21.006, 53, 126, 257/134, 217, 218, 229, 304, 32, 329, 352
See application file for complete search history.

(56) References Cited

U.S. PATENT DOCUMENTS

| 7,709,383 B2 * | 5/2010 | Kato et al. ..................... 438/679 |
| 7,929,209 B2 * | 4/2011 | Sakamoto et al. ........ 359/485.05 |
| 2008/0157113 A1 * | 7/2008 | Hayashi .......................... 257/98 |
| 2010/0244196 A1 * | 9/2010 | Yoshida ........................ 257/615 |

FOREIGN PATENT DOCUMENTS

| JP | 2004072052 | 3/2004 |
| JP | 2006245043 | 9/2006 |

* cited by examiner

*Primary Examiner* — David Nhu
(74) *Attorney, Agent, or Firm* — Turocy & Watson, LLP

(57) ABSTRACT

A method for manufacturing a semiconductor device includes: irradiating a growth substrate with laser light to focus the laser light into a prescribed position inside a crystal for a semiconductor device or inside the growth substrate, the crystal for the semiconductor device being formed on a first major surface of the growth substrate; moving the laser light in a direction parallel to the first major surface; and peeling off a thin layer including the crystal for the semiconductor device from the growth substrate, a wavelength of the laser light being longer than an absorption end wavelength of the crystal for the semiconductor device or the growth substrate, the laser light being irradiated inside a crystal for the semiconductor device or inside the growth substrate.

17 Claims, 5 Drawing Sheets

1

METHOD FOR MANUFACTURING SEMICONDUCTOR DEVICE AND APPARATUS FOR MANUFACTURING SAME

CROSS-REFERENCE TO RELATED APPLICATIONS

This application is based upon and claims the benefit of priority from the prior Japanese Patent Application No. 2009-186535, filed on Aug. 11, 2009; the entire contents of which are incorporated herein by reference.

BACKGROUND

Removing unnecessary substrates of a semiconductor chip to thin the chip has various advantages in improving device characteristics. For example, in the case of LEDs of gallium nitride (GaN) type fabricated by using a sapphire substrate, which has insulating properties, removing the sapphire substrate greatly improves light output. That is, eliminating the interface between a GaN-based semiconductor crystal and sapphire improves light extraction efficiency, and removing sapphire, which has a low thermal conductivity, improves heat release of the chip. These contribute significantly to the improvement of light output.

However, in the case of fabricating a thinned GaN-based LED of what is called a thin-film structure, the process of removing the sapphire substrate remains unstable and may influence manufacturing efficiency.

A laser lift-off method is considered as a technique of removing the sapphire substrate. The laser lift-off method is a method that delivers laser light, which passes through the sapphire substrate and is absorbed in the GaN-based crystal, to separate the GaN crystal at the sapphire/GaN interface. In this method, since the GaN and the sapphire are separated at the same time as the GaN is separated, residual stresses at the time of crystal growth are concentrated at the boundary between a region not irradiated with the laser and the separated region. Therefore, it is a problem that causes a crack in the GaN-type crystal.

JP-A 2004-072052 (Kokai) discloses a technology that adjusts the power of delivered laser light to form an alteration layer at the sapphire/GaN interface in order to prevent crack generation in a separated nitride semiconductor film. JP-A 2006-245043 (Kokai) discloses a technology that forms an alteration section in a sapphire substrate by laser irradiation and divides a wafer along the formed alteration section into chips.

SUMMARY

According to an aspect of the invention, there is provided a method for manufacturing a semiconductor device including: irradiating a growth substrate with laser light to focus the laser light into a prescribed position inside a crystal for a semiconductor device or inside the growth substrate, the crystal for the semiconductor device being formed on a first major surface of the growth substrate; moving the laser light in a direction parallel to the first major surface; and peeling off a thin layer including the crystal for the semiconductor device from the growth substrate, a wavelength of the laser light being longer than an absorption end wavelength of the crystal for the semiconductor device or the growth substrate, the laser light being irradiated inside a crystal for the semiconductor device or inside the growth substrate.

According to another aspect of the invention, there is provided a method for manufacturing a semiconductor device including peeling off a crystal for a semiconductor device formed on a growth substrate from the growth substrate, the method including: attaching a supporting substrate to a first major surface side of the growth substrate, the crystal for the semiconductor device being formed on the growth substrate; forming a peeling-off interface by focusing a laser light of a wavelength longer than an absorption end wavelength of the crystal for the semiconductor device or the growth substrate in the crystal for the semiconductor device or the growth substrate and moving the laser light parallel to the first major surface; and peeling off the crystal for the semiconductor device attached to the supporting substrate from the growth substrate by changing a temperature of the growth substrate after irradiating the laser light.

According to another aspect of the invention, there is provided an apparatus for manufacturing a semiconductor device including: a stage mounting a wafer to be processed; a laser light source configured to emit laser light; an optical system focusing the laser light at a prescribed position inside the wafer to be processed; a driving system configured to move at least one of the stage and the optical system to move the laser light along the wafer to be processed; a measuring system configured to measure a warp amount of the wafer to be processed; and a control system feeding back a warp amount measured by the measuring system to the driving system, maintaining a light focusing position of the laser light at a certain depth from the wafer to be processed, and moving the laser light.

DETAILED DESCRIPTION

Figure 1A:
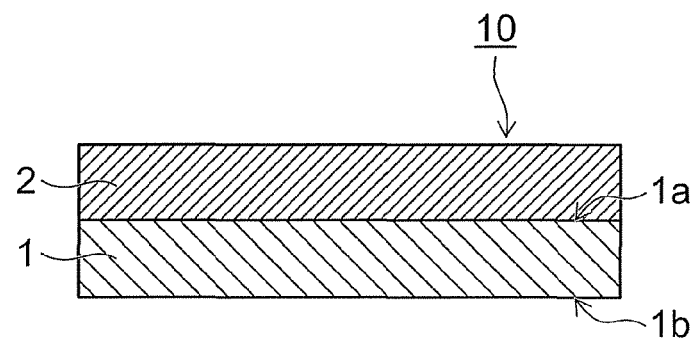
FIGS. 1A to 1C are cross-sectional views schematically showing part of a manufacturing process of a semiconductor device according to a first embodiment of the invention.

Embodiments of the invention will now be described with reference to the drawings. In the following description, a method for manufacturing a GaN-based LED of thin-film structure and an apparatus for manufacturing the same are described as an example of semiconductor devices according to embodiments of the invention. In the drawings, identical portions are marked with like reference numerals, and a description is omitted for overlapped portions as appropriate.

First Embodiment

FIG. 1A to FIG. 2B are schematic views illustrating a method for manufacturing a GaN-based LED of thin-film structure according to this embodiment in the order of processes.

FIG. 1A is a cross-sectional view schematically illustrating an epitaxial wafer (hereinafter referred to as "epiwafer") 10 used for manufacturing the GaN-based LED.

The epiwafer 10 has a configuration in which a GaN-based epitaxial crystal (hereinafter referred to as "epicrystal") 2, i.e., a crystal for a semiconductor device, is formed on a first major surface is of a sapphire substrate 1. The sapphire substrate 1 is a growth substrate. The GaN-based epicrystal 2 is a multilayered epitaxial growth layer formed by MOCVD, in which a low-temperature growth GaN buffer layer, an n-type GaN layer, and a light-emitting layer formed of an MQW (multiple quantum well) layer of GaN/InGaN are stacked and a p-type GaN is grown at the end. Details of these may be similar to an epistructure used for common GaN-based LEDs.

Figure 1B:
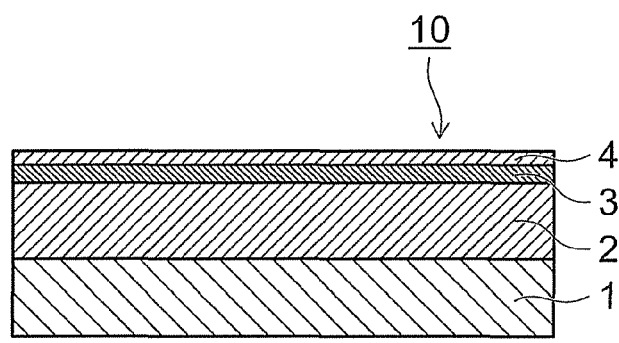

FIG. 1B is a cross-sectional view schematically illustrating the state in which a high-reflection electrode 3 and a joining metal 4 are formed on the GaN-based epicrystal 2 of the epiwafer 10.

The high-reflection electrode 3 has a configuration in which Ni and Ag are stacked from the GaN-based epicrystal 2 side. The Ni layer forms an ohmic contact with the p-type GaN layer that is an end layer of the GaN-based epicrystal 2. The Ag layer stacked on the Ni layer is a reflection film provided for reflecting the light generated in the light-emitting layer to the sapphire substrate 1 side. When finally the sapphire substrate 1 is removed to form an LED device, the LED light is output from the GaN-based epicrystal 2 to the sapphire substrate 1 side. Therefore, providing the high-reflection electrode 3 on the side of the surface of the GaN-based epicrystal 2 can improve light output. The Ni layer located between the Ag layer, i.e., a reflection film, and the light-emitting layer is formed with a film thickness of approximately several to ten nanometers so as not to become an absorber of the LED light.

The joining metal 4 is formed on the high-reflection electrode 3. The joining metal 4 is a stacked film of Au/AuSn from the high-reflection electrode 3 side. When joining a silicon substrate that supports the GaN-based epicrystal 2 peeled off from the sapphire substrate 1, the joining metal 4 functions as a joining layer to attach the GaN-based epicrystal 2. A not-illustrated barrier metal layer may be provided between the high-reflection electrode 3 and the joining metal 4. The barrier metal is made of, for example, a metal film having a multilayer structure of Pt/W/Ti/Pt/W/Pt/Au from the high-reflection electrode 3 side, and functions to prevent mutual diffusion of metal atoms that constitute the high-reflection electrode 3 and the joining metal 4. That is, an Au atom and/or an Sn atom are prevented from migrating from the joining metal 4 side to the high-reflection electrode 3, and this can prevent a deterioration of LED characteristics due to a decrease in the reflectance of the Ag film and an increase in the contact resistance of (p-type GaN)/Ni.

Figure 1C:
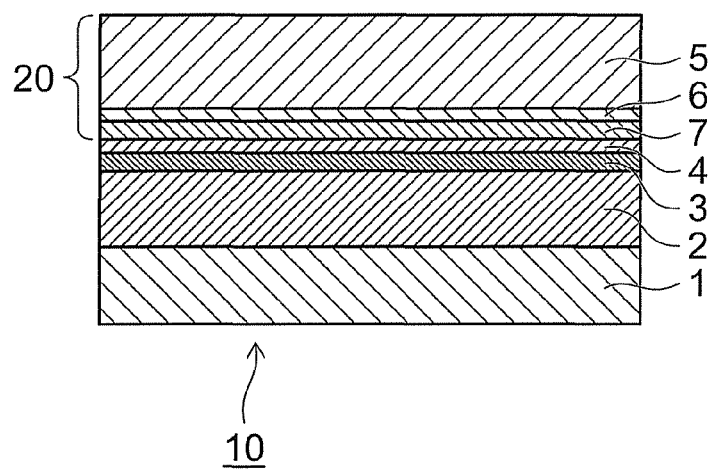

FIG. 1C is a cross-sectional view schematically illustrating the state in which the epiwafer 10 and a supporting substrate 20 are joined.

The supporting substrate 20 is used for supporting the GaN-based epicrystal 2 after the sapphire substrate 1 is peeled off. In this embodiment, the supporting substrate 20 is made of a stacked film in which an ohmic electrode 6 in which a stacked structure of Ti/Pt is formed from the substrate side and a joining metal 7 in which Au/AuSn are stacked from the ohmic electrode 6 side are film-formed on a p-type silicon substrate 5.

The epiwafer 10 and the supporting substrate 20 are joined via the joining metals 4 and 7. In regard to the joining method, first, the joining metal 4 of the epiwafer 10 and the joining metal 7 of the supporting substrate 20 are caused to be in face-contact with each other and are weighted to be adhered to each other closely. Further, in the state of adding weight, the temperature is raised to near the melting point of AuSn and then gradually lowered to fuse the joining metals 4 and 7.

Figure 2A:
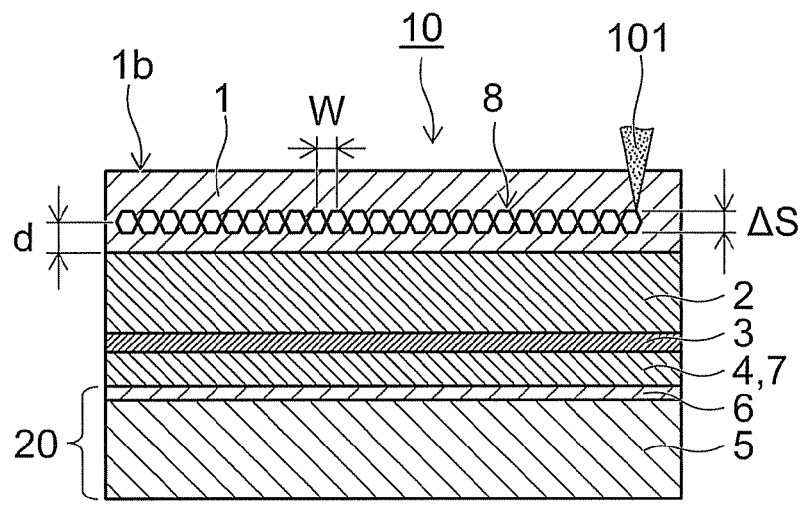
FIGS. 2A and 2B are cross-sectional views schematically showing a laser irradiation process and a peeling-off process according to this embodiment.

FIG. 2A is a cross-sectional view schematically illustrating a laser irradiation process according to this embodiment.

Laser light 101 is irradiated from the side of a second major surface 1$b$ that is the back side of the first major surface 1$a$ of the sapphire substrate 1. The laser light 101 is focused into prescribed positions inside the sapphire substrate 1 and is moved (scanned) in a direction parallel to the first major surface 1$a$ to form a peeling-off interface 8. Although the laser light 101 may be either continuous light (CW) or pulse light (PW), it is preferably pulse laser, which has a high peak power.

The wavelength of the delivered laser light 101 is made longer than the absorption end wavelength of the sapphire substrate 1 and the GaN-based epicrystal 2 that constitute the epiwafer 10, so that ordinary interband absorption may not be generated. Thereby, the GaN-based epicrystal 2 can be prevented from being damaged due to the laser irradiation. A fundamental wave of a titanium-sapphire laser regenerative amplifier, for example, may be used as the laser light 101.

The laser light (fundamental wave) emitted from the titanium-sapphire laser regenerative amplifier has characteristics of, for example, a center wavelength of 800 nm, a pulse width of 100 fs (femtoseconds), a repetition frequency of 1 kHz, and a pulse energy of 100 μJ (microjoules). When the laser light was focused in air by using an optical system used in this embodiment, a space profile of the Gaussian distribution was obtained, and the spot size that is defined by the width at $1/e^2$ of the peak intensity was approximately 20 μm.

The epiwafer 10 attached to the supporting substrate 20 is mounted on a stage movable in the horizontal direction, and the stage is moved at a prescribed pitch to scan the laser light 101. In this embodiment, for example, the distance d between the light focusing position of the laser light 101 and the interface between the sapphire substrate 1 and the GaN-based epicrystal 2 may be set to 20 μm, and the stage may be moved at a feed speed of 10 mm/sec with a step pitch w of 10 μm in order to irradiate the entire surface of the sapphire substrate 1 with the laser light.

It is found that the sapphire substrate becomes clouded in the region irradiated with the laser light 101. In regard to this, it is conceivable that the molecular structure of the sapphire is broken by the laser light 101 and then recrystallization occurs or an amorphous alumina region or an air vacancy (void) is generated. That is, the irradiation with the laser light 101 generates an alteration region in the sapphire substrate to form the peeling-off interface 8. When a cross section of this alteration region is observed, damage due to the laser irradiation occurs only inside the sapphire substrate 1 and does not reach the GaN-based epicrystal 2.

It is normally thought that interband light absorption of sapphire does not occur at a wavelength of 800 nm of the laser light 101. However, if a region with a very high photon density is generated inside sapphire, the contribution of nonlinear optical susceptibility increases and nonlinear light absorption effect increases at an exponential rate. It is conceivable that the laser light is thereby absorbed to form the alteration region. Furthermore, delivering laser light having a photon energy equal to the energy of lattice vibration between an Al atom and an O atom that constitute sapphire also can cause damage to the crystal to form the alteration region. In other words, the resonance absorption effect using light in the infrared region, which has a longer wavelength, may also be used. As a method of generating a high photon density, increasing the number of photons per pulse of the laser light or narrowing the pulse width to increase the peak power are commonly used. In this embodiment, the pulse width is narrowed to increase the peak power of the laser light, and it allows the formation of the alteration region.

Performing laser irradiation over the entire wafer surface forms the clouded peeling-off interface 8 inside the sapphire substrate 1. In this state, although the bonding force is weak, occasionally the sapphire substrate 1 is not peeled off but left as is. Therefore, in the next peeling-off process, peeling-off processing that leaves a thin layer including the GaN-based epicrystal 2 and peels off the sapphire substrate 1 is performed.

In regard to the peeling-off processing, for example, the epiwafer 10 in which the peeling-off interface 8 is formed is placed on a hot plate heated to approximately 200° C., and is cooled rapidly after sufficiently warmed. At this time, stress caused by a difference in thermal expansion between the sapphire substrate 1, and the supporting substrate 20 and the GaN-based epicrystal 2 is relaxed at the peeling-off interface 8 and generates a crack. Thereby, the sapphire substrate 1 is peeled off.

The wafer may be heated by being irradiated with light of a mercury lamp and the like. On the other hand, the rapid cooling can be easily performed by placing the wafer that has been heated on the hot plate onto a metal block. Furthermore, the peeling-off processing can be performed also by heating the wafer with a high-temperature oven and then transferring the wafer to a low-temperature cooling bath. Alternatively, it is also possible to expose the wafer to a gaseous or liquid refrigerant.

Figure 2B:
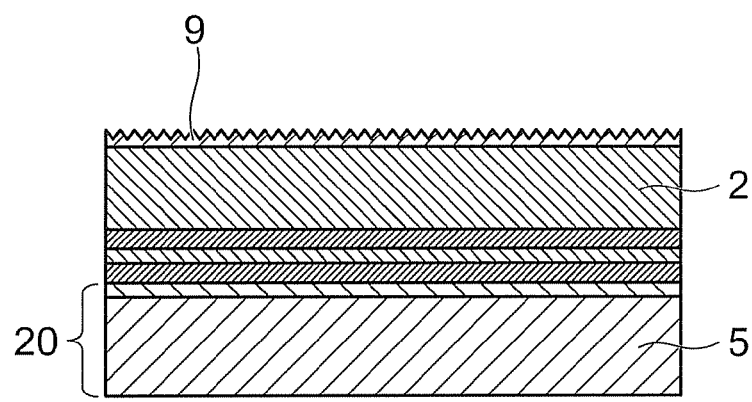

FIG. 2B is a cross-sectional view schematically illustrating the state after the sapphire substrate 1 is peeled off.

Since the peeling-off interface 8 is formed inside the sapphire substrate 1, a residual sapphire layer 9 is present at the surface even after the sapphire substrate 1 is peeled off. The residual sapphire layer 9 reflects the LED light at the interface with the GaN-based epicrystal 2 to decrease extraction efficiency, resulting in a decrease in light output. Furthermore, an n-side electrode cannot be formed if the residual sapphire layer 9 is left. Accordingly, the surface from which the sapphire substrate 1 has been peeled off is polished to remove the residual sapphire layer 9. Further, chemical mechanical polishing (CMP) is performed on the exposed GaN surface to form a flat surface free from cracks.

Figure 3:
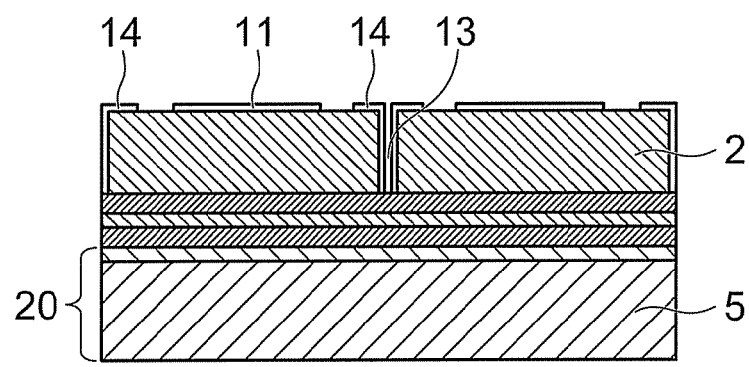
FIG. 3 is a cross-sectional view schematically showing a structure of the semiconductor device according to this embodiment.

FIG. 3 is a schematic view illustrating a cross section of the GaN-based LEDs fabricated by the manufacturing method according to this embodiment. In order to improve light extraction efficiency, dry etching is performed on the CMP-processed GaN surface to form a microstructure at the surface. Next, a metal for an n-side electrode, for example, a metal layer in which Ti/Al/Ti/Pt/Au are stacked in this order from the GaN layer surface is formed on the microfabricated surface, and is patterned by using photolithography to form an n-side electrode 11. Furthermore, a mesa groove 13 is formed by using dry etching to separate the element into individual LEDs. Finally, $SiO_2$ end-face protection films 14 are formed by using, for example, plasma CVD so that electrical leakage may not occur at the mesa groove 13. At this point, when a current is passed between a not-illustrated p-side electrode formed in the p-type silicon substrate 5 of the supporting substrate 20 and the n-side electrode 11, electrical characteristics equivalent to conventional LED devices using the laser lift-off method can be obtained.

Figure 4:
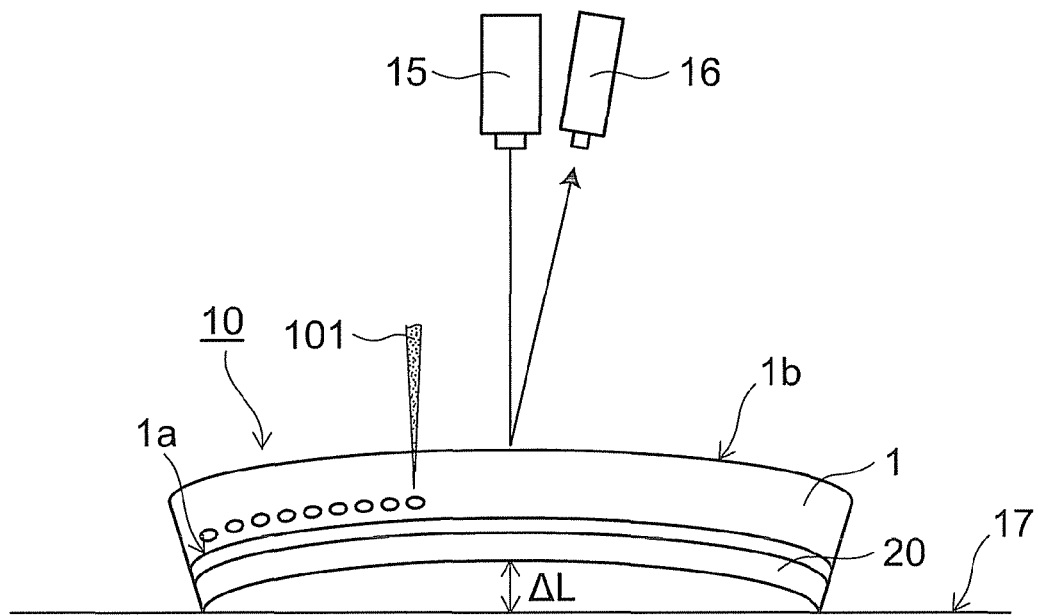
FIG. 4 is a schematic view showing the laser irradiation process according to this embodiment.

FIG. 4 is a schematic view illustrating a method that performs laser irradiation after correcting the warp of the wafer.

The epiwafer 10 in which the GaN-based epicrystal 2 is grown on the sapphire substrate 1 has a great warp because the difference in thermal expansion coefficient between the sapphire substrate 1 and the GaN-based epicrystal 2 is large. For example, a sapphire substrate with two inches φ or three inches φ may have a warp amount of several tens micrometers at the center. Accordingly, it is necessary to correct the warp amount in order to scan the laser light 101 over the first major surface 1a or the second major surface 1b of the sapphire substrate 1 at a nearly regular distance in the depth direction.

Therefore, the laser irradiation process preferably includes: a measuring process that measures the warp amount of the sapphire substrate 1; and a scanning process that corrects the light focusing position of the laser light 101 based on the warp amount, maintains the light focusing position at a substantially regular distance in the depth direction from the first major surface is of the sapphire substrate 1, and scans the laser light.

As illustrated in FIG. 4, the warp amount $\Delta L$ of the epiwafer 10 mounted on a processing stage 17 by causing the supporting substrate 20 to be in contact with the processing stage 17 can be monitored by a measuring apparatus that combines a laser oscillator for measurement 15 and a laser light measuring apparatus 16, for example. Here, it is clear that the warp amount $\Delta L$ is equal to the warp amount of the sapphire substrate 1.

As illustrated in the drawing, the laser oscillator for measurement 15 delivers laser light to the second major surface 1b of the sapphire substrate 1, and the laser light measuring apparatus 16 measures the laser light reflected at the second major surface 1b of the sapphire substrate 1. When the epiwafer 10 moves by the movement of the processing stage 17 in the horizontal direction, the reflection position of the laser light on the second major surface 1b of the sapphire substrate 1 changes. At this time, since the height of the reflection point on the second major surface 1b changes to correspond to the warp amount $\Delta L$ of the epiwafer 10, the detection position of the laser light detected by the laser light measuring apparatus 16 changes. The warp amount $\Delta L$ can be measured by monitoring the change in the detection position in relation to the reflection position on the second major surface 1b of the sapphire substrate 1.

In the measuring process that measures the warp amount of the epiwafer 10, the processing stage 17 is moved in the horizontal direction to measure the warp amount $\Delta L$ of the epiwafer 10, and the warp amount $\Delta L$ is recorded in relation to the measurement position on the second major surface 1b of the sapphire substrate 1.

Next, in the scanning process that scans the laser light 101, the light focusing position of the laser light 101 is corrected to reflect the warp amount $\Delta L$ recorded in the measuring process. Specifically, the correction is performed by changing the vertical position of the processing stage 17 by the warp amount that corresponds to the irradiation position of the laser light 101.

In the first embodiment mentioned above, the light focusing position of the laser light 101 is set inside the sapphire substrate 1 distant from the interface between the sapphire substrate 1 and the GaN-based epicrystal 2 by 20 μm. Since the spot size of the laser light 101 is 20 μm and the alteration region generated by the laser irradiation is formed in a region with a high level of photon, the width $\Delta S$ of the peeling-off interface 8 is estimated to be not more than 20 μm. Therefore, the thickness of the residual sapphire layer 9 after peeling off the sapphire substrate 1 is considered to be not less than 10 μm.

On the other hand, in order to avoid damaging the light-emitting layer of the LED when the residual sapphire layer 9 is removed by polishing, it is necessary to stop polishing near the interface between the sapphire substrate 1 and the GaN-based epicrystal 2. To this end, it is preferable that the residual sapphire layer 9 is made thin to facilitate the control of the polishing amount. Accordingly, it is preferable that the distance between the light focusing position of the laser light 101 and the interface between the sapphire substrate 1 and the GaN-based epicrystal 2 is made not more than the spot size of the laser light 101 and that the thickness of the residual sapphire layer 9 is made not more than 10 µm. Although the spot size measured in air is used in the embodiment mentioned above, it is more preferable that the light focusing position is set by using the spot size inside the wafer, which can be estimated in view of the difference in refractive index.

Furthermore, it is necessary to shorten the time for scanning the entire surface of the sapphire substrate 1 with the laser light 101 in order to improve manufacturing efficiency. Accordingly, an experiment was performed by changing the pitch w of the scanning process of the laser light 101. There was no difference in the quality of the GaN-based epicrystal 2 after processing when the step pitches were 10 µm and 20 µm. However, when the step pitch was made 50 µm, cracks appeared markedly in part of the surface after peeling-off. When the step pitch was 100 µm or more, there was the case where the peeling-off itself of the sapphire substrate 1 was not able to be performed or cracks were generated remarkably in the periphery of the wafer. Namely, in order to generate no crack in the GaN-based epicrystal after peeling off, the step pitch w of the laser light is made preferably not more than twice the spot size (20 µm), and more preferably not more than the spot size. The spot size mentioned here is the value when the laser light 101 is focused in air.

It is clear that, if the step pitch w is larger than the spot size, the alteration region is no longer a continuous interface and the peeling-off interface 8 becomes a surface in which alteration regions are arranged in the scanning direction of the laser light 101.

The method for manufacturing the semiconductor device according to this embodiment has an advantage over processing methods according to the conventional laser lift-off technique also in regard to using irradiation of laser light of a wavelength longer than the absorption end wavelength of the growth substrate or the epicrystal for the semiconductor device in which the laser light is focused. In the conventional art, thermal damage may be caused to a device because of thermal processing. That is, when laser lift-off is performed by the conventional method, it is necessary to raise the temperature of GaN to not lower than 1000° C., which is not lower than the melting point, in the laser irradiation section. At this time, since heat is conducted to each part of the device, the possibility that the heat conduction causes a device deterioration cannot be ruled out. For example, the effect of heat cannot be eliminated completely also in the invention described in JP-A 2004-072052 (Kokai), in which the power of the delivered laser light is adjusted for the purpose of preventing crack generation in a nitride-based semiconductor layer. In contrast, in this embodiment, the delivered laser light is absorbed in neither the epicrystal for semiconductor nor the growth substrate, and the process for forming the alteration layer is not thermal processing. Therefore, it is conceivable that this embodiment is advantageous in no deterioration of the device due to heat conduction to each part of the device.

Second Embodiment

Figure 5:
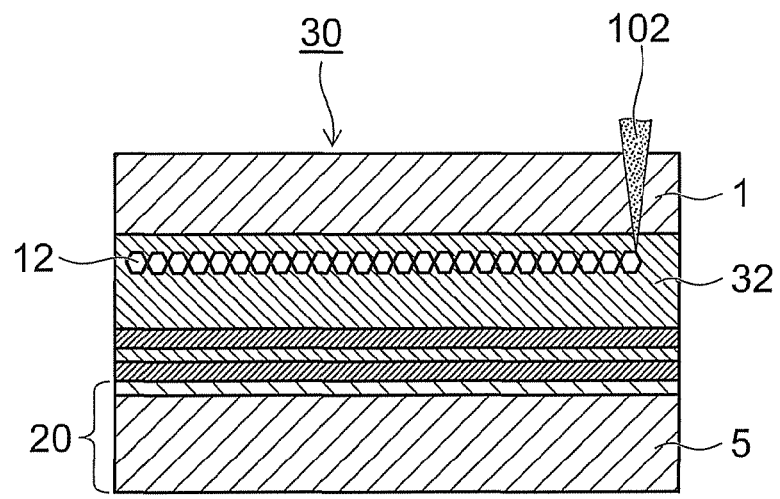
FIG. 5 is a cross-sectional view schematically showing part of a laser irradiation process according to a second embodiment of the invention.

FIG. 5 is a cross-sectional view schematically illustrating a laser irradiation process according to a second embodiment.

This embodiment is advantageous in the case where an LED is manufactured by using an epiwafer 30 in which a GaN-based epicrystal 32 is formed relatively thick. Furthermore, it is advantageous also in the case where an epiwafer in which the GaN-based epicrystal 2 is grown on a GaN wafer is used.

The focus of laser light 102 may be set so that the laser light 102 may be focused with shift to the n-type GaN side from the interface between the sapphire substrate 1 and the GaN-based epicrystal 32. In this embodiment as well, the n-type GaN is preferably left thick, and the amount of the shift from the interface is preferably not more than the spot size. For example, the focus may be set on the n-type GaN side distant from the interface by 2 µm.

In regard to the scanning process of the laser light 102, for example, the epiwafer 30 may be moved by setting the feed speed (10 mm/sec) of the stage 17 to make the pitch at 10 µm. At this time, in this embodiment as well, it is preferable that the laser light is scanned after correcting the warp amount of the epiwafer 30 as illustrated in FIG. 4.

After scanning the laser light, similarly to the first embodiment described above, it is found that the wafer becomes clouded along the line irradiated with the laser light 102. This probably indicates that the crystal of GaN is broken by the laser light 102, and then it is recrystallized or an alteration region in which amorphous GaN or simple Ga and air vacancy (nitrogen void) coexist is generated. Furthermore, when the entire surface of the epiwafer 30 is irradiated with the laser light 102, the entire inside of the epiwafer 30 becomes clouded to form a peeling-off interface 12. Although the bonding force remains weak in this state, the sapphire substrate 1 is not peeled off. When the epiwafer 30 after the laser irradiation is placed on a hot plate heated at approximately 200° C., for example, and is cooled rapidly after sufficiently warmed, a crack is generated in the complex state of recrystallized GaN/Ga/(amorphous GaN)/void and the like coexisting in the alteration region because of stress due to a difference in thermal expansion in the epiwafer 30. As a result, the sapphire substrate 1 is peeled off at the peeling-off interface 12.

Next, chemical mechanical polishing (CMP) is performed on the surface of the wafer that has been peeled off inside the n-type GaN. Thereby, a flat GaN surface free from cracks can be obtained. Furthermore, in order to increase the efficiency of light extraction from the n-type GaN surface, the surface in the state in which the sapphire substrate 1 is peeled off may be used without performing polishing processing.

This embodiment performs processing on the assumption that the n-type GaN is exposed after peeling off the sapphire substrate 1. However, if the light focusing position of the laser light 102 is set near the interface between the sapphire substrate 1 and the GaN-based epicrystal 32, an alteration region may be formed in some regions inside the sapphire, and a residual sapphire layer that cannot be removed completely by CMP may be left. In this case, CMP is performed on the surface of the GaN after performing polishing processing of the residual sapphire layer, and processes similar to the first embodiment are performed. Finally-manufactured LEDs can achieve characteristics equivalent to the first embodiment.

In order to process without leaving the residual sapphire layer, the light focusing position of the laser light 102 is preferably set at a position deeper than 2 µm from the interface between the sapphire substrate 1 and the GaN-based epicrystal 32 to the GaN layer side. To this end, the thickness of the GaN layer is preferably made thick. For example, it is preferable that the GaN layer is formed with a thickness not less than 10 µm.

On the other hand, in the case where an epiwafer in which a GaN-based epicrystal is grown on a GaN wafer is used in place of the sapphire substrate 1, the distance from the interface between the GaN wafer and the GaN-based epicrystal to the light focusing position of the laser light can be set suitably. Therefore, it is conceivable that LEDs can be manufactured efficiently. Furthermore, it is conceivable that reusing the peeled-off GaN wafer has a great advantage in cost.

Figure 6:
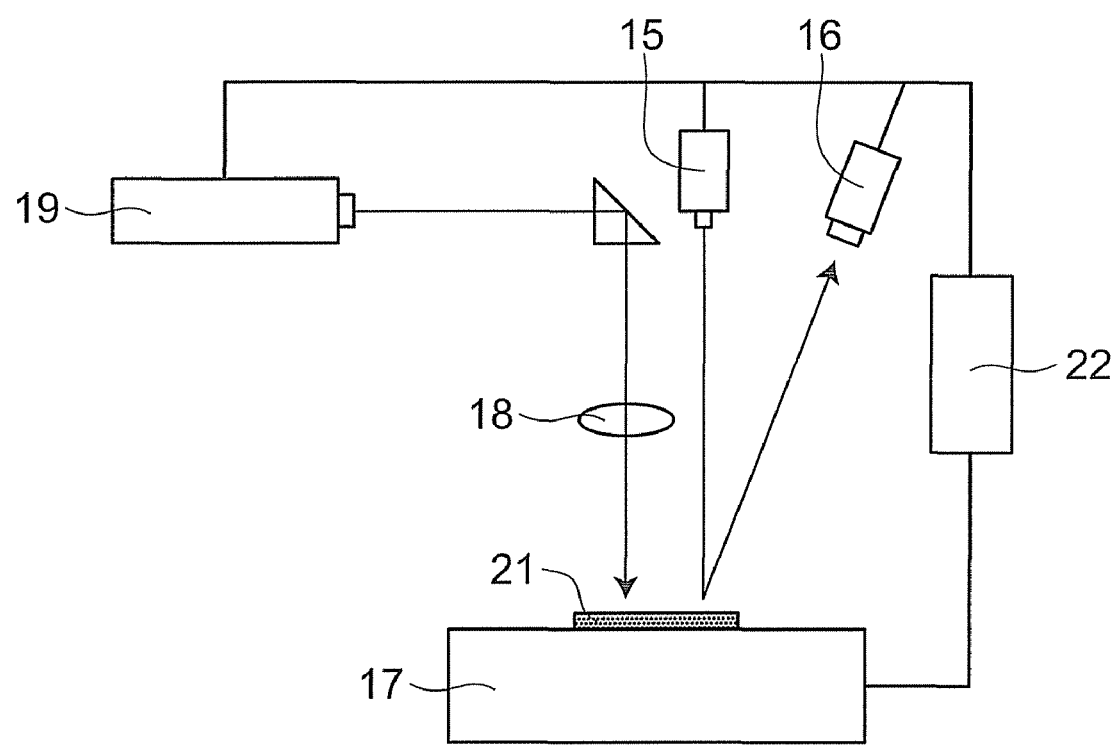
FIG. 6 is a block diagram showing a manufacturing apparatus of a semiconductor device according to this embodiment.

FIG. 6 is a block diagram illustrating an apparatus for manufacturing a semiconductor device according to this embodiment. The semiconductor manufacturing apparatus illustrated in the drawing is a laser irradiation apparatus and includes: a processing stage 17 on which a wafer 21 in which the crystal for the semiconductor device is formed is mounted; a laser oscillator 19 that irradiates the wafer 21 with the laser light of a wavelength longer than the absorption end wavelength of the wafer 21 in which the crystal for the semiconductor device is formed; and an optical system 18 that focuses the laser light at a prescribed position inside the wafer 21. The processing stage 17 includes a driving system for moving it in the horizontal and vertical directions and is controlled by a controller 22 to scan the laser light along the surface of the wafer 21.

Furthermore, the warp amount of the wafer 21 is measured by using a measuring system that includes the laser oscillator for measurement 15 and the laser light measuring apparatus 16. The controller 22 feeds back the warp amount measured by the measuring system to the driving system of the processing stage 17, maintains the light focusing position of the laser light at a substantially regular distance from the surface of the wafer 21 in which the semiconductor device is formed, and scans the laser light. At this time, the controller 22 measures the warp amount of the wafer 21 and memorizes it in relation to the in-plane position of the wafer 21. After that, the controller 22 reads out and feeds back the memorized warp amount when scanning the laser light. Alternatively, the controller may sequentially feed back the warp amount and scan the laser light while the warp amount of the wafer 21 is measured.

Figure 7:
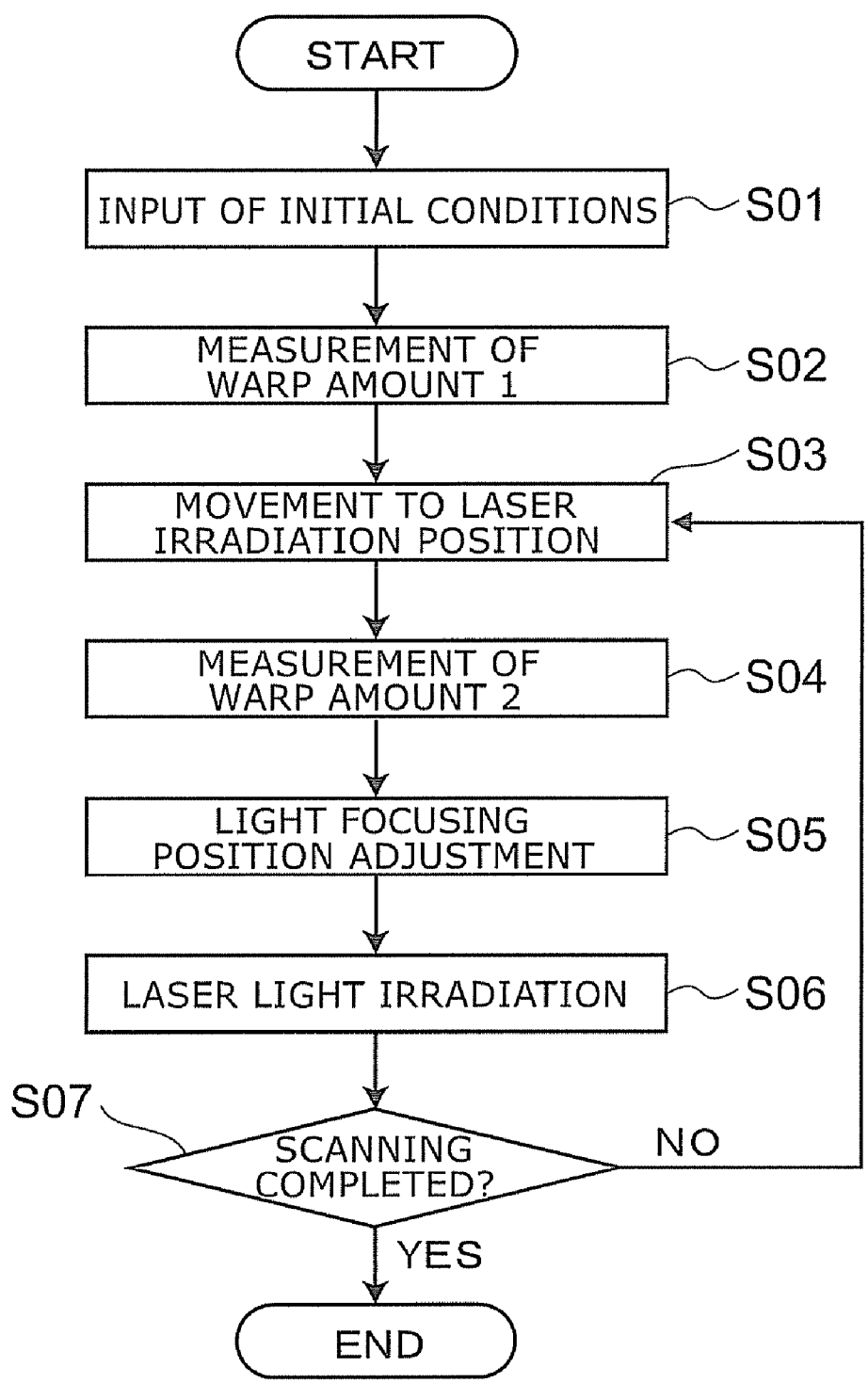
FIG. 7 is a flow chart showing an example of the operation of the laser irradiation apparatus illustrated in FIG. 6.

FIG. 7 is a flow chart illustrating an example of the operation of the laser irradiation apparatus illustrated in FIG. 6.

First, the controller 22 receives input of the irradiation scope of the laser light and the scanning method (S01). For example, the size of the wafer 21 may be selected from predetermined multiple wafer sizes to input. Also, scanning patterns of the laser light in the wafer surface may be preinstalled to input selectively. Furthermore, the spot size and the scanning pitch of the laser light may be input.

Next, the controller 22 operates the driving system of the processing stage 17 to measure the warp amount of the entire surface of the wafer 21 by using the measuring system of the laser oscillator for measurement 15 and the laser light measuring apparatus 16 (S02). The measurement position and the warp amount are memorized in a memory device provided in the controller 22.

Subsequently, the driving system of the processing stage 17 is operated to move the processing stage 17 so that the laser light of the laser oscillator 19 is delivered to a prescribed position inside the wafer 21 (S03).

Next, at the position to which the stage moved, the warp amount is measured with the measuring system of the laser oscillator for measurement 15 and the laser light measuring apparatus 16 (S04). For example, the warp amount of the neighborhood of the prescribed position inside the wafer 21 irradiated with the laser light of the laser oscillator 19 is measured, and the difference with the measurement data of the same position, which has been measured and memorized in advance, is detected.

Further, the warp amount of the irradiation position of the laser light is corrected based on the detected difference, and the height of the processing stage 17 is controlled to adjust the light focusing position of the laser light (S05).

Subsequently, the laser light of the laser oscillator 19 is delivered to form an alteration region inside the wafer 21 (S06).

Next, the controller 22 determines whether the scanning of the laser light over the irradiation scope set in step 01 has been completed. The operation is finished if it has been completed. If the scanning of the laser light has not been completed, the operation goes back to step 03 and makes to move the stage 17 to the next irradiation position (S07).

In regard to the laser oscillator 19 used for this embodiment, titanium sapphire laser, fiber laser, and YAG laser of a second harmonic wave, for example, are given. Out of these, fiber laser is preferably used in view of apparatus cost and operability. Furthermore, it is inexpensive and advantageous in durability and lifetime compared with laser oscillators used for the conventional laser lift-off method in that a laser oscillator and an optical system of the visible to infrared region can be used. More specifically, in the past, it has been necessary to select a wavelength range that is transparent to sapphire and can generate light absorption only with GaN, and laser oscillators of a wavelength range of 180 nm to 360 nm have been used. For example, YAG laser of third or fourth harmonic wave (355 nm, 266 nm), excimer laser (153 nm, 248 nm, 308 nm), and the like are given.

Hereinabove, the first and second embodiments are described, but the invention is not limited to the first and second embodiments. For example, the GaN wafer described above, an SiC wafer, and the like may be used in addition to the sapphire substrate.

Furthermore, the semiconductor device of the invention is not limited to GaN-based LEDs. By peeling off the growth substrate, the invention is advantageous also for semiconductor devices of which characteristics are improved by improving heat release efficiency and the like. For example, the invention is applicable also to electronic devices for electric power control such as a GaN heterojunction FET.

In the specification of the application, the "(gallium nitride)-based semiconductor" includes group III-V compound semiconductors of $In_xAl_yGa_{(1-x-y)}N$ ($0 \leq x \leq 1$, $0 \leq y \leq 1$, $0 \leq x+y \leq 1$), and the group V elements include also mixed crystals containing phosphorus (P), arsenic (As) and/or the like in addition to N (nitrogen).

The invention claimed is:

1. A method for manufacturing a semiconductor device, the method comprising:
   irradiating a growth substrate with laser light to focus the laser light into a prescribed position inside a crystal for a semiconductor device or inside the growth substrate, the crystal for the semiconductor device being formed on a first major surface of the growth substrate;
   moving the laser light in a direction parallel to the first major surface; and
   peeling off a thin layer including the crystal for the semiconductor device from the growth substrate,
   a wavelength of the laser light being longer than an absorption end wavelength of the crystal for the semiconductor device or the growth substrate, the laser light being irradiated inside the crystal for the semiconductor device or inside the growth substrate.

2. The method of claim 1, wherein the thin layer including the crystal for the semiconductor device is peeled off from the growth substrate by changing a temperature of the growth substrate after irradiating the laser light.

3. The method of claim 1, wherein an interface between the thin layer and the growth substrate including an alteration region of the growth substrate is formed by moving the laser light.

4. The method of claim 1, wherein an interface the thin layer and the growth substrate including an alteration region of the crystal for the semiconductor device is formed by moving the laser light.

5. The method of claim 1, wherein the laser light is irradiated from a side of a second major surface after a metal film is formed on the crystal for the semiconductor device, the second major surface being a back side of the first major surface of the growth substrate.

6. The method of claim 1, further comprising:
measuring a warp amount of the growth substrate; and
correcting a light focusing position of the laser light on basis of the warp amount, maintaining a light focusing position in a depth direction from the first major surface of the growth substrate, and moving the laser light.

7. The method of claim 1, wherein the crystal for the semiconductor device is made of a gallium nitride-based semiconductor, and the growth substrate is sapphire substrate.

8. The method of claim 1, wherein a distance from an interface between the growth substrate and the crystal for the semiconductor device to a light focusing position of the laser light is not more than a spot size of the focused laser light.

9. The method of claim 1, wherein a pitch of the movement of the laser light is not more than twice a spot size of the focused laser light.

10. A method for manufacturing a semiconductor device including peeling off a crystal for a semiconductor device formed on a growth substrate from the growth substrate, the method comprising:
attaching a supporting substrate to a first major surface side of the growth substrate, the crystal for the semiconductor device being formed on the growth substrate;
forming a peeling-off interface by focusing a laser light of a wavelength longer than an absorption end wavelength of the crystal for the semiconductor device or the growth substrate in the crystal for the semiconductor device or the growth substrate and moving the laser light parallel to the first major surface; and
peeling off the crystal for the semiconductor device attached to the supporting substrate from the growth substrate by changing a temperature of the growth substrate after irradiating the laser light.

11. The method of claim 10, wherein the peeling-off interface includes an alteration region formed by focusing the laser light.

12. The method of claim 10, wherein the laser light is delivered from a side of a second major surface after a metal film is formed on the crystal for the semiconductor device, the second major surface being a back side of the first major surface of the growth substrate.

13. The method of claim 10, wherein the forming the peeling-off interface includes:
measuring a warp amount of the growth substrate; and
correcting a light focusing position of the laser light on basis of the warp amount, maintaining the light focusing position in a depth direction from the first major surface of the growth substrate, and moving the laser light.

14. The method of claim 10, wherein the crystal for the semiconductor device is made of a gallium nitride-based semiconductor, and the growth substrate is a sapphire substrate.

15. The method of claim 10, wherein a distance from an interface between the growth substrate and the crystal for the semiconductor device to a light focusing position of the laser light is not more than a spot size of the focused laser light.

16. The method of claim 10, wherein a pitch of the movement of the laser light is not more than twice a spot size of the focused laser light.

17. The method of claim 10, wherein the supporting substrate has conductivity.

* * * * *